(12) United States Patent
Hansen

(10) Patent No.: US 10,633,281 B2
(45) Date of Patent: Apr. 28, 2020

(54) SOLID STATE BINDER

(71) Applicant: ROCKWOOL INTERNATIONAL A/S, Hedehusene (DK)

(72) Inventor: Erling Lennart Hansen, Virum (DK)

(73) Assignee: ROCKWOOL INTERNATIONAL A/S, Hedehusene (DK)

( * ) Notice: Subject to any disclaimer, the term of this patent is extended or adjusted under 35 U.S.C. 154(b) by 0 days.

(21) Appl. No.: 15/750,934

(22) PCT Filed: Aug. 22, 2016

(86) PCT No.: PCT/EP2016/069805
§ 371 (c)(1),
(2) Date: Feb. 7, 2018

(87) PCT Pub. No.: WO2017/036838
PCT Pub. Date: Mar. 9, 2017

(65) Prior Publication Data
US 2018/0201542 A1     Jul. 19, 2018

(30) Foreign Application Priority Data
Aug. 28, 2015  (EP) ..................... 15183049

(51) Int. Cl.
| | |
|---|---|
| *C03C 25/321* | (2018.01) |
| *D04H 1/4209* | (2012.01) |
| *D04H 1/60* | (2006.01) |
| *D04H 1/587* | (2012.01) |
| *C03C 25/25* | (2018.01) |
| *C03C 25/24* | (2018.01) |
| *C03C 25/32* | (2018.01) |
| *C03C 25/26* | (2018.01) |
| *C08L 3/02* | (2006.01) |
| *C03C 13/06* | (2006.01) |
| *C03C 25/002* | (2018.01) |
| *C03C 25/34* | (2006.01) |
| *C03C 25/42* | (2006.01) |

(52) U.S. Cl.
CPC ............ *C03C 25/321* (2013.01); *C03C 13/06* (2013.01); *C03C 25/002* (2013.01); *C03C 25/24* (2013.01); *C03C 25/25* (2018.01); *C03C 25/26* (2013.01); *C03C 25/32* (2013.01); *C03C 25/34* (2013.01); *C03C 25/42* (2013.01); *C08L 3/02* (2013.01); *D04H 1/4209* (2013.01); *D04H 1/587* (2013.01); *D04H 1/60* (2013.01)

(58) Field of Classification Search
CPC ....... C03C 13/06; C03C 25/002; C03C 25/42; C03C 25/24; C03C 25/25; C03C 25/26; C03C 25/34; C03C 25/321; C03C 25/32; C03C 37/005; C08K 2003/309; C08K 5/42; C08K 3/28; C08L 5/00; C08L 3/02; D04H 1/4209; D04H 1/587; D04H 1/60; E04C 2/16; C08B 37/0006; C08J 2361/04; C08J 5/04; C08J 5/044; C08J 5/24
USPC ............. 252/8.83; 427/212; 524/27, 56, 58; 527/312; 106/162.1, 206.1; 428/297.4, 428/323, 292.1; 442/176, 327
See application file for complete search history.

(56) References Cited

U.S. PATENT DOCUMENTS

| | | | |
|---|---|---|---|
| 2010/0222459 A1 | 9/2010 | Kelly et al. | |
| 2011/0101260 A1 | 5/2011 | Pons et al. | |
| 2014/0001676 A1 | 1/2014 | Jorgensen et al. | |
| 2016/0177057 A1* | 6/2016 | Hjelmgaard | ............ E04C 2/16 106/217.5 |
| 2016/0177068 A1* | 6/2016 | Hjelmgaard | ............ C08L 5/00 106/217.5 |

FOREIGN PATENT DOCUMENTS

| | | | |
|---|---|---|---|
| EP | 2223940 A1 | 9/2010 | |
| WO | 2012103966 A1 | 8/2012 | |
| WO | 2013179323 A1 | 12/2013 | |
| WO | 2016102444 A1 | 6/2016 | |
| WO | 2016102447 A1 | 6/2016 | |

* cited by examiner

*Primary Examiner* — Camie S Thompson
(74) *Attorney, Agent, or Firm* — Abel Schillinger, LLP

(57) ABSTRACT

The present invention is directed to a solid state binder composition for binding mineral fibers comprising a component (i) in form of one or more carbohydrates; a component (ii) in form of one or more compounds selected from sulfamic acid, derivatives of sulfamic acid or any salt thereof.

15 Claims, No Drawings

SOLID STATE BINDER

FIELD OF THE INVENTION

The present invention relates to a binder for mineral fibre products, a method of producing a bonded mineral fibre product using said binder, and a mineral fibre product comprising mineral fibres in contact with the cured binder.

BACKGROUND OF THE INVENTION

Mineral wool products (also termed mineral fibre products) generally comprise man-made vitreous fibres (MMVF) such as, e.g., glass fibres, ceramic fibres, basalt fibres, slag fibres, mineral fibres and stone fibres (rock fibres), which are bonded together by a cured thermoset polymeric binder material. For use as thermal or acoustical insulation products, bonded mineral fibre mats are generally produced by converting a melt made of suitable raw materials to fibres in conventional manner, for instance by a spinning cup process or by a cascade rotor process.

The binder material may be applied to the mineral fibres immediately after the fibres are formed. Alternatively the binder material is applied to the mineral fibres in an off-line process separate from the fibre forming process. The binder material in the latter case is traditionally a solid-state binder which is not in a diluted aqueous solution. Such binders are referred to as dry binders. Mineral fibre products with dry binders are formed by mixing the mineral fibres and the binder material to form a mixture and applying heat and pressure to the mixture in a plate press apparatus to provide a cured mineral fibre product. A conventional dry binder material is a phenol-formaldehyde resin with a hardener material. Other binders are being developed to avoid the emission of formaldehyde.

Since some of the starting materials used in the production of the known binders are rather expensive chemicals, there is an ongoing need to provide formaldehyde free binders which are economically produced and at the same time show good bonding properties for producing a bonded mineral fibre product.

A further effect in connection with previously known binder compositions from mineral fibres is that at least the majority of the starting materials used for the productions of these binders stem from fossil fuels. There is an ongoing trend of consumers to prefer products that are at least partly produced from renewable materials and there is therefore a need to provide binders for mineral wool which are at least partly produced from renewable materials.

Further, there is an ongoing need to provide binders for mineral wool which enable the production of mineral wool products having good long term mechanical properties.

SUMMARY OF THE INVENTION

Accordingly, it was an object of the present invention to provide a solid state binder which is particularly suitable for bonding mineral fibres, is economically produced, has a good storability, shows good properties for bonding mineral fibre products and is including renewable materials as starting products.

In accordance with a first aspect of the present invention, there is provided a solid state binder composition for binding mineral fibers comprising a component (i) in form of one or more carbohydrates; a component (ii) in form of one or more compounds selected from sulfamic acid, derivatives of sulfamic acid or any salt thereof. In accordance with a second aspect of the present invention, there is provided a method of producing a bonded mineral fiber product which comprises the steps of contacting the mineral fibers with the binder composition defined above.

In accordance with a third aspect of the present invention, there is provided a mineral fibre product comprising mineral fibres in contact with the cured binder composition defined above.

The present inventors have surprisingly found that it is possible to prepare a binder composition for mineral fibres that is based on the combination of a carbohydrate component and a component selected from sulfamic acid, derivatives of sulfamic acid or any salt thereof. It is highly surprising that by the combination of these two components, binder compositions can be prepared which are suitable for bonding mineral fibres. Both these components have a comparatively low price and are easy to handle.

It is further surprising that a binder composition based on the combination of a carbohydrate component and a component selected from sulfamic acid, derivatives of sulfamic acid or any salt thereof can be used as a solid state binder, i.e. that it is not necessary to bring this binder composition into an aqueous form in order to apply it to the mineral fibres.

At the same time, the binders according to the present invention show excellent properties when used for binding mineral fibres.

As can be seen from the experimental results documented in the examples below, the binder compositions according to the present invention show excellent properties when used as a binder for mineral wool.

The reaction loss from curing achieved with binders according to aspects of the present invention is on the same level or higher than the reaction loss for reference binder. However, unlike the binders according to the present invention, the reference binder needs a pre-reaction for the preparation with associated reaction losses.

DESCRIPTION OF THE PREFERRED EMBODIMENTS

The binder composition according to the present invention comprises:
a solid state binder composition for binding mineral fibers comprising
a component (i) in form of one or more carbohydrates;
a component (ii) in form of one or more compounds selected from sulfamic acid, derivatives of sulfamic acid or any salt thereof.

Preferably, the binders according to the present invention are formaldehyde-free. For the purpose of the present application, the term "formaldehyde free" is defined to characterise a mineral wool product where the emission is below 8 µg/m²/h of formaldehyde from the mineral wool product, preferably below 5 µg/m²/h, most preferably below 3 µg/m²/h. Preferably the test is carried out in accordance with ISO 16000 for testing aldehyde emissions. Preferably the binder composition does not contain added formaldehyde.

In a preferred embodiment, the solid state binder composition has a water content, calculated as the weight of water in relation to the weight of the total solid state binder, of ≤30%, in particular ≤25%, more preferably ≤10%.

The water content in the solid state binder can be determined based on the weight of water that evaporates at 105° C. in 1 hour at ambient pressure from the binder.

Preferably, 50 wt. % of the components of the solid state binder has a particle size of less than 500µ, such as less than 200μ, such as less than 100μ and more than 10μ, such as more than 20μ, such as more than 25μ.

The definition of the particle size is carried out by applying the binder to a screen for which the mesh width is the particle size to determined, e.g. 200μ. The particles recovered after the screening thus has a particle size of less than or equal to 200μ. Thereafter, the wt. % screened can be determined.

In one embodiment the solid state binder composition is able to flow out of a model silo in a mass flow pattern, said model silo having stainless steel walls with a circular hopper, a hopper angle of 30°, and a hopper opening diameter of 20 cm.

A suitable test for determining whether a sample of binder is "free-flowing" is to determine whether the binder is able to flow out of a standardised hopper in a mass flow pattern. The term "mass flow" is known in the art of silo design and refers to the fact that the whole contents of a silo is in movement when product is withdrawn from the bottom of the silo, i.e. the "first in-first out" principle applies to the flow, which is regular and easily controllable. A less desirable flow pattern is "Core flow" or "funnel flow", where the product flows through the core of the silo, so that stagnant zones where product is at rest are found along the wall areas of the silo. The presence of mass flow depends on the internal friction of the product, the wall friction, the hopper shape, the hopper angle and the size of the hopper opening. For a given hopper, the "mass flow angle", which is the angle of the hopper (to the vertical) where mass flow can still occur, may be calculated (when the internal friction and wall friction are known) or determined empirically. At angles greater than the mass flow angle, i.e. less steep hoppers, funnel flow will occur.

To test the flow properties of a sample of binder, a model silo having stainless steel walls with a round hopper, a hopper angle of 30°, and a hopper opening diameter of 20 cm may be employed. For testing, the silo is filled to a minimum fill level of 30 cm above the transition from the silo to the hopper, and a maximum fill level of not more than 3 m. When filling a completely empty silo, a small quantity of the binder (e.g. about 5 litres) should be withdrawn once the fill level reaches the transition, so as to avoid a "bridging" effect caused by binder at the bottom of the silo being subjected to a higher pressure. Product should be withdrawn evenly over the entire area of the opening. Using such a standard hopper, binder is defined as "free-flowing" if it is able to flow out of the hopper in a mass flow pattern. Non-free flowing binder, on the other hand, will—if it is able to flow out of the hopper at all—flow in a funnel flow pattern. The flow pattern in any given case can readily be determined by visual observation. Preferably, the free-flowing binder also flow in a mass flow pattern using the same type of hopper and the same procedure, but with a hopper opening diameter of 15 cm.

Component (i) of the Binder

Component (i) is in the form of one or more carbohydrates.

Starch may be used as a raw material for various carbohydrates such as glucose syrups and dextrose. Depending on the reaction conditions employed in the hydrolysis of starch, a variety of mixtures of dextrose and intermediates is obtained which may be characterized by their DE number. DE is an abbreviation for Dextrose Equivalent and is defined as the content of reducing sugars, determined by the method specified in International Standard ISO 5377-1981 (E).

This method measures reducing end groups and attaches a DE of 100 to pure dextrose and a DE of 0 to pure starch.

In a preferred embodiment, the carbohydrate is selected from sucrose, reducing sugars, in particular dextrose, polycarbohydrates, and mixtures thereof, preferably dextrins and maltodextrins, more preferably dry glucose syrups, and more preferably dry glucose syrups with a dextrose equivalent value of DE=5 to less than 100, such as DE=60 to less than 100, such as DE=60-99, such as DE=85-99, such as DE=95-99.

In a further preferred embodiment, the carbohydrate is dextrose and/or one or more carbohydrate component having a DE value of 60, in particular 60 to 100, more particular 85 to 100.

The term "dextrose" as used in this application is defined to encompass glucose and the hydrates thereof.

In a further preferred embodiment, the carbohydrate is selected from hexoses, in particular allose, altrose, glucose, mannose, gulose, idose, galactose, talose, psicose, fructose, sorbose and/or tagatose; and/or pentoses, in particular arabinose, lyxose, ribose, xylose, ribulose and/or xylulose; and/or tetroses, in particular erythrose, threose, and/or erythrulose.

In a further preferred embodiment, the carbohydrate is one or more carbohydrate components selected from the group consisting of hexose, such as dextrose, fructose, pentose such as xylose, and/or sucrose, dry glucose syrup, dextrin or maltodextrin.

Since the carbohydrates of component (i) are comparatively inexpensive compounds and are produced from renewable resources, the inclusion of high amounts of component (i) in the binder according to the present invention allows the production of a binder for mineral wool which is advantageous under economic aspects and at the same time allows the production of an ecological non-toxic binder.

Component (ii) of the Binder

Component (ii) is in form of one or more compounds selected from sulfamic acid, derivatives of sulfamic acid or any salt thereof.

Sulfamic acid is a non-toxic compound having the formula

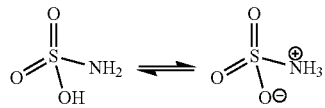

Sulfamic acid and many of its salts are storage stable non-volatile compounds and are available at a comparatively low price.

In a preferred embodiment, component (ii) is selected from the group consisting of ammonium sulfamate, calcium sulfamate, sodium sulfamate, potassium sulfamate, magnesium sulfamate, cobalt sulfamate, nickel sulfamate, N-cyclohexyl sulfamic acid and any salt thereof, such as sodium N-cyclohexyl sulfamate, piperazinium sulfamate, sulfamates of polyamines such as hexamethylenediamine sulfamate, m-xylylenediamine sulfamate, diethylenetriamine sulfamate, triethylenetetramine sulfamate, tetraethylenepentamine sulfamate and/or monoethanolamine sulfamate, diethanolamine sulfamate, and/or triethanolamine sulfamate.

In a preferred embodiment, component (i) is in form of dextrose and/or a dry carbohydrate component having a DE of ≥60, in particular of 60 to 100, more particular 85 to 100;

a component (ii) in form of sulfamic acid and/or its salts, preferably ammonium sulfamate and/or N-cyclohexyl sulfamic acid and/or its salts.

In a further preferred embodiment, the proportion of components (i) and (ii) is within the range of 0.5-15 wt.-%, in particular 1-12 wt.-%, more particular 2-10 wt.-% component (ii), based on the mass of component (i).

In a particularly preferred embodiment, component (ii) is ammonium sulfamate.

Besides providing binders which allow the production of mineral wool products having excellent mechanical properties, the inclusion of component (ii) also in general imparts improved fire resistance for aspects according to the invention.

In a particularly preferred embodiment, the component (ii) is in form of N-cyclohexyl sulfamic acid and any salt thereof and the proportion of component (i) and component (ii) in form of N-cyclohexyl sulfamic acid and any salt thereof is within the range of 0.5-20 wt.-%, in particular 1-15 wt.-%, more particular 2-10 wt.-% component (ii), based on the mass of component (i).

Accordingly, the binder composition according to the present invention can be produced with weight proportions of the components (i) and (ii) so that the major part of the binder is the carbohydrate component, which is a renewable material. This gives the binder of the present invention the character of a product produced from biological materials.

Component (iii) of the Binder

In a preferred embodiment, the solid state binder composition according to the present invention further comprises a component (iii) in form of one or more amines selected from the group of piperazine, polyamines such as hexa-methyl-enediamine, m-xylylenediamine, diethylenetriamine, triethylenetetramine, tetraethylenepentamine and/or monoethanolamine, diethanolamine, and/or triethanolamine and salts thereof.

In a preferred embodiment, the solid state binder composition according to the present invention comprises a component (i) in form of dextrose and/or a dry carbohydrate component having a DE of ≥60, in particular of 60 to 100, more particular 85 to 100;
a component (ii) in form of sulfamic acid and/or its salts, preferably ammonium sulfamate and/or N-cyclohexyl sulfamic acid and/or its salts;
a component (iii) in form of amines such as piperazine, polyamines such as hexamethylenediamine, m-xylylenediamine, diethylenetriamine, triethylene-tetramine, tetraethylenepentamine and/or monoethanolamine, diethanolamine, and/or triethanolamine.

In a particularly preferred embodiment, the weight ratios of the components in the binder according to the present invention are such that the proportion of components (i), (ii) and (iii) is within the range of 0.5-15 wt.-%, in particular 1-12 wt.-%, more particular 2-10 wt.-% component (ii), based on the mass of component (i), and in which the component (iii) is preferably present in the amount of 0.1 to 5 molar equivalents of component (iii) relative to the molar equivalents of component (ii).

Component (iv) of the Binder

In a preferred embodiment, the binder composition according to the present invention further comprises a component (iv) in form of a carboxylic acid, such as a monomeric mono-, di-, tri-, and polycarboxylic acid, preferably citric acid.

In a preferred embodiment the component (iv) is selected from monomeric polycarboxylic acids, polymeric polycarboxylic acids, monomeric monocarboxylic acids, and/or polymeric monocarboxylic acid, such as polyacrylic acid.

In a particular preferred embodiment, component (iv) is citric acid.

A preferred binder composition according to the present invention including component (iv) comprises:
a component (i) in form of a dry glucose syrup having a DE of 60 to less than 100, in particular 60 to 99, more particular 95 to 99;
a component (ii) in form of sulfamic acid and/or its salts, preferably ammonium sulfamate and/or N-cyclohexyl sulfamic acid and/or its salts;
a component (iv) in form of triammonium citrate and/or citric acid.

Preferably, the proportion of components (i), (ii) and (iv) is within the range of 0.5 to 15 wt.-%, in particular 1 to 12 wt.-%, more particular 2 to 10 wt.-% component (ii) based on the mass of component (i), 3 to 30 wt.-%, in particular 5 to 25 wt.-%, more particular 8 to 20 wt.-% (iv) based on the mass of component (i).

The citric acid may advantageously be added as ammonium salt of citric acid, such as triammonium citrate.

Component (v) of the Binder

In a preferred embodiment, the binder composition according to the present invention further comprises a component (v) in form of one or more compounds selected from
compounds of the formula, and any salts thereof:

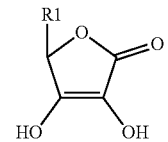

in which R1 corresponds to H, alkyl, monohydroxyalkyl, dihydroxyalkyl, polyhydroxyalkyl, alkylene, alkoxy, amine;
compounds of the formula, and any salts thereof:

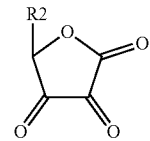

in which R2 corresponds to H, alkyl, monohydroxyalkyl, dihydroxyalkyl, polyhydroxyalkyl, alkylene, alkoxy, amine.

In a preferred embodiment, component (v) is selected from the group of L-ascorbic acid, D-isoascorbic acid, 5,6-isopropylidene ascorbic acid, dehydroascorbic acid and/or any salt of the compounds, preferably calcium, sodium, potassium, magnesium or iron salts.

In a particularly preferred embodiment, component (v) is L-ascorbic acid.

A preferred binder composition including component (v) comprises
component (i) in form of dextrose and/or a dry glucose syrup having a DE of 60 to less than 100, in particular 60 to 99, more particular 85 to 99;
component (ii) in form of sulfamic acid and/or its salts, preferably ammonium sulfamate and/or N-cyclohexyl sulfamic acid and/or its salts;
component (v) in form of ammonium ascorbate.

Preferably, the proportion of components (i), (ii) and (v) is within the range of 50 to 99 weight-% component (i) based on the mass of components (i) and (v), 1 to 50 weight-%, preferably 1 to 30 weight-%, more preferably 1 to 20 weight-% component (v) based on the mass of components (i) and (v), 0.5-15 wt.-%, in particular 1-12 wt.-%, more particular 2-10 wt.-% component (ii), based on the mass of components (i) and (v).

Ascorbic acid, or vitamin C, is a non-toxic, naturally occurring organic compound with antioxidant properties, which can be produced from biomass. Ascorbic acid and its derivatives are therefore a product which is produced from renewable sources and can at the same time be obtained at a comparatively low price.

Component (vi) of the Binder

In a preferred embodiment, the binder composition according to the present invention further comprises a component (vi) selected from ammonium sulfate salts, ammonium phosphate salts, ammonium nitrate salts, ammonium carbonate salts and/or salts of sulfuric acid, nitric acid, boric acid, hypophosphorous acid, such as sodium hypophosphite, ammonium hypophoshite and/or phosphoric acid.

In a preferred embodiment, the solid state binder composition comprises
- component (i) in form of dextrose and/or a dry glucose syrup having a DE of 60 to less than 100, in particular 60 to 99, more particular 85 to 99;
- component (ii) in form of sulfamic acid and/or its salts, preferably ammonium sulfamate and/or N-cyclohexyl sulfamic acid and/or its salts;
- component (vi) in form of hypophosphorous acid and/or salts thereof, preferably ammonium hypophosphite.

In a preferred embodiment, the proportion of components (i), (ii) and (vi) is within the range of 0.5-15 wt.-%, in particular 1-12 wt.-%, more particular 2-10 wt.-% component (ii), based on the mass of component (i), 0.5-10 wt.-%, in particular 1-8 wt.-%, more particular 1-5 wt.-% component (vi), based on the mass of component (i), and whereby component (iii) is preferably present in the amount of 0.1 to 5 molar equivalents of component (iii) relative to the combined molar equivalents of component (ii) and (vi).

Ammonium sulfate salts may include $(NH_4)_2SO_4$, $(NH_4)HSO_4$ and $(NH_4)_2Fe(SO_4)_2 \cdot 6H_2O$.

Ammonium carbonate salts may include $(NH_4)_2CO_3$ and $NH_4HCO_3$.

Ammonium phosphate salts may include $H(NH_4)_2PO_4$, $NH_4H_2PO_4$ and ammonium polyphosphate.

Component (vii) of the Binder

In a preferred embodiment, the binder composition according to the present invention further comprises a component (vii) in form of urea.

In a preferred embodiment, the solid state binder composition comprises
- component (i) in form of dextrose and/or a dry glucose syrup having a DE of 60 to less than 100, in particular 60 to 99, more particular 85 to 99;
- a component (ii) in form of sulfamic acid and/or its salts, preferably ammonium sulfamate and/or N-cyclohexyl sulfamic acid and/or its salts;
- component (vi) in form of one or more ammonium salts;
- a component (vii) in form of urea.

In a preferred embodiment, the proportion of components (i), (ii) and (vii) is within the range of 0.5-15 wt.-%, in particular 1-12 wt.-%, more particular 2-10 wt.-% component (ii), based on the mass of component (i), 0.5-40 wt.-%, in particular 1-30 wt.-%, more particular 5-25 wt.-% component (vii), based on the mass of component (i).

The inclusion of urea in the binder according to aspects of the present invention improves the fire resistance properties.

Further Components

In a preferred embodiment, other components such as one or more reactive or nonreactive silicones may be added to the binder composition of the present invention. Preferably, the one or more reactive or nonreactive silicone is selected from the group consisting of silicone constituted of a main chain composed of organosiloxane residues, especially diphenylsiloxane residues, alkylsiloxane residues, preferably dimethylsiloxane residues, bearing at least one hydroxyl, carboxyl or anhydride, amine, epoxy or vinyl functional group capable of reacting with at least one of the constituents of the binder composition and is preferably present in an amount of 0.1-15 weight-%, preferably from 0.1-10 weight-%, more preferably 0.3-8 weight-%, based on the total binder mass.

In one embodiment, a silane may be added to the binder composition of the present invention.

Optionally, an emulsified hydrocarbon oil may be added to the binder composition according to the present invention.

Method According to the Present Invention

The present invention is also directed to a method of producing a bonded mineral fibre product which comprises the steps of contacting mineral fibres with a binder composition described above and curing the binder composition.

In a preferred embodiment, the curing of the binder composition in contact with the mineral fibers takes place in a heat press.

The curing of a binder composition in contact with the mineral fibers in a heat press has the particular advantage that it enables the production of high-density products. The binder composition according to the present invention is particularly suitable for use in such a method because it is a solid state binder and therefore the evaporation of the solution water is avoided.

Preferably, the curing of the binder composition in contact with the mineral fibers takes place in a heat press of 160 to 260° C., in particular 180 to 250° C., in particular 200 to 230° C.

The temperatures above are the set temperature of the heat press.

There are several ways to prepare the solid state binder according to the present invention from the starting compounds.

In a preferred embodiment, the binder contacted with the mineral fibres is prepared by dry mixing of the constituents wherein the average water content of the constituents, calculated as the weight of water in relation to the weight of the total solid state binder, is ≤30%, in particular ≤25%, more preferably ≤10%.

In an alternative preferred embodiment, the binder contacted with the mineral fibres is prepared by dissolving all constituents in water followed by evaporating the water forming a powder.

A preferred method of evaporating the water to form a powder involves the use of spray drying the binder.

In a preferred embodiment, the method according to the present invention can be carried out so that no prepolymerisation of the monomers in the binder takes place before application of the binder.

This is a further advantage over prior art binders which do need such a prepolymerisation of the monomers before application of the binder.

The present invention is also directed to a mineral fibre product, comprising mineral fibres in contact with the cured binder composition described above. The mineral fibres employed may be any of man-made vitreous fibres (MMVF), glass fibres, ceramic fibres, basalt fibres, slag fibres, rock fibres, stone fibres and others. These fibres may be present as a wool product, e.g. like a rock wool product.

Suitable fibre formation methods and subsequent production steps for manufacturing the mineral fibre product are those conventional in the art. The mineral fibre products produced, for instance, have the form of woven and non-woven fabrics, mats, batts, slabs, sheets, plates, strips, rolls, and other shaped articles which find use, for example, as thermal or acoustical insulation materials, vibration damping, construction materials such as window profiles, facade insulation, reinforcing materials for roofing or flooring applications, as filter stock and in other applications.

In accordance with the present invention, it is also possible to produce composite materials by combining the bonded mineral fibre product with suitable composite layers or laminate layers such as, e.g., metal, wood, plaster boards, glass surfacing mats and other woven or non-woven materials.

Although the binder composition according to the present invention is particularly useful for bonding mineral fibres, it may equally be employed in other applications typical for binders and sizing agents, e.g. as a binder for foundry sand, chipboard, glass fibre tissue, cellulosic fibres, non-woven paper products, composites, moulded articles, coatings etc.

In a preferred embodiment, the mineral fiber product according to the present invention has a density of 80 to 1200 kg/m$^3$ in particular 150 to 1000 kg/m$^3$, more preferably 500 to 1000 kg/m$^3$.

Preferably, the mineral fiber product according to the present invention has an ignition loss of 3 to 30%, in particular 5 to 25%, more particular 10 to 20%.

The following examples are intended to further illustrate the invention without limiting its scope.

EXAMPLES

In the following examples, several binders which fall under the definition of the present invention were prepared and compared to binders according to the prior art.

Unless stated otherwise, the following reagents were used as received:

| Reagent | Supplier | Form |
| --- | --- | --- |
| dextrose, 96%, anhydrous | Sigma-Aldrich, 158968 | Fine powder |
| Ammonium sulfamate, ≥98% | Sigma-Aldrich, 228745 | Crystalline |
| Ammonium hypophosphite, ≥97% | Sigma-Aldrich, 04401 | Crystalline |

The mineral fibres used in the Examples were rock fibres with a high-alumina, low-silica/Roxul 1000 Composition.

The binder reaction loss is calculated as the difference in the binder content before and after curing.

Binder Mixing, Method A

The reagents were mixed well and the resulting mixture was milled portion-wise (50-100 g per portion) in a Herzog milling machine (running time: 12 seconds for each portion).

Binder Mixing, Method B

The non-carbohydrate reagent(s) were ground very thoroughly in a mortar. An equal amount of dextrose was then added to the mortar and the resulting mixture was ground very thoroughly. This mixture was then mixed well with the remaining amount of dextrose.

Binder Example, Reference Binder A

The reference binder was a conventional phenol-formaldehyde resin from Dynea with the trade name Prefere 94 8182U7 including an amine cross-linker.

Binder Example, Entry 1, Mixing Method B

Ammonium sulfamate (14.0 g) was ground very thoroughly in a mortar. Dextrose (14.0 g) was added to the mortar and the resulting mixture was ground very thoroughly. This mixture was then mixed well with the remaining amount of dextrose (686.0 g).

Binder Example, Entry 2, Mixing Method A

Dextrose (3.00 kg) was mixed well with ammonium sulfamate (0.15 kg). The resulting mixture was milled portion-wise (50-100 g per portion) in a Herzog milling machine (running time: 12 seconds for each portion).

The following properties were determined for the binders according to the present invention and the binders according to the prior art, respectively.

Tile Production

The tiles were made by mixing the required amounts of silane-treated mineral wool with binder followed by curing in a heat press. The silane was DS1151 supplied by Degussa. For production of each tile, the mineral wool-binder mixture (approx. 0.8 kg) was transferred into a 40 cm×40 cm form, evened out and pressed flat. The uncured mineral wool-binder mixture was then transferred carefully to a heat press heated to 230° C., and the tile was cured until the desired internal temperature of the tile was reached (180-195° C.; tile thickness approx. 0.5-1 cm).

Tile Measurements.

The heat press would produce tiles that were approx. 5 mm thick in one side and approx. 1 cm thick in the other side. This allowed for investigation of "thin/high density" samples and "thick/low density" samples from each tile.

Thus, one tile from each test was first cut to 40 cm×40 cm size and the tile was then cut into samples of 50 mm width. A sample with approx. 5 mm thickness was used to measure thin/high density data while a sample with approx. 10 mm thickness was used to measure thick/low density data. The slabs were broken in a 3 point bending test (velocity bending: 10.0 mm/min; support distance: 140.0 mm for thin/high density slabs, 200.0 mm for thick/low density slabs) on a 3-point bending machine. Loss of ignition was then measured on one of these broken samples.

|  | Example | | | | | |
| --- | --- | --- | --- | --- | --- | --- |
|  | A | 1 | 2 | 3 | 4 | 5 |
| Binder composition per weight | | | | | | |
| Dextrose | — | 100 | 100 | 100 | 100 | 100 |
| Ammonium sulfamate | — | 2 | 5 | 5 | 10 | — |
| Binder mixing | | | | | | |
| Mixing method | — | B | A | A | A | A |
| Curing data | | | | | | |
| Final internal temperature (° C.) | 180 | 195 | 195 | 190 | 195 | 195 |
| Tile data | | | | | | |
| Average thickness (mm) | 9.6 | 6.6 | 7.7 | 10.2 | 6.8 | 10.0 |
| Average density (kg/m$^3$) | 475 | 643 | 547 | 445 | 656 | 445 |
| LOI (%) | 15.3 | 12.2 | 10.7 | 10.7 | 21.5 | 24.2 |
| Reaction loss (%) | 12% | 32% | 41% | 41% | 36% | 26% |
| Strength (N/mm$^2$) | 3.5 | 2.4 | 2.7 | 0.9 | 4.9 | 0.5 |

The invention claimed is:

1. A solid state binder composition for binding mineral fibers, wherein the composition comprises (i) one or more carbohydrates; and (ii) one or more compounds selected from sulfamic acid, derivatives of sulfamic acid, and salts of sulfamic acid, and wherein one or more of
   (a) the composition comprises not more than 30% by weight of water, calculated as weight of water in relation to weight of the total composition;
   (b) 50 wt. % of components of the composition have a particle size of less than 500 µm and more than 10 µm;
   (c) the composition further comprises (iii) one or more amines selected from piperazine, polyamines, monoethanolamine, diethanolamine, triethanolamine, and salts of these amines;
   (d) the composition further comprises (iv) citric acid;
   the composition further comprises (v) one or more compounds selected from
   compounds of formula

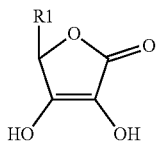

and salts thereof;
   in which R1 represents H, alkyl, monohydroxy alkyl, dihydroxyalkyl, polyhydroxyalkyl, alkenyl, alkoxy, amino;
   compounds of formula

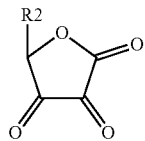

and salts thereof;
   in which R2 represents H, alkyl, monohydroxyalkyl, dihydroxyalkyl, polyhydroxyalkyl, alkenyl, alkoxy, amino.

2. The binder composition of claim 1, wherein the composition comprises not more than 25% by weight of water.

3. A method of producing a bonded mineral fiber product, wherein the method comprises contacting mineral fibers with the binder composition of claim 2 and curing the binder composition.

4. The binder composition of claim 1, wherein the composition comprises not more than 10% by weight of water.

5. The binder composition of claim 1, wherein (i) is one or more carbohydrates selected from hexoses, pentoses, dry glucose syrup, dextrin, and maltodextrin.

6. The binder composition of claim 1, wherein (ii) is selected from ammonium sulfamate, calcium sulfamate, sodium sulfamate, potassium sulfamate, magnesium sulfamate, cobalt sulfa a nickel sulfamate, N-cyclohexyl sulfamic acid and salts thereof, piperazinium sulfamate, sulfamates of polyamines, monoethanolamine sulfamate, diethanolamine sulfamate, and triethanolamine sulfamate.

7. The binder composition of claim 1, wherein the composition comprises 0.5-15 wt.-% of component (ii), based on a mass of component (i).

8. The binder composition of claim 1, wherein the composition is present as a powder.

9. The binder composition of claim 1, wherein the composition has been prepared by mixing its constituents, an average water content of the constituents being not more than 30%, calculated as weight of water in relation to a weight of the total composition.

10. The binder composition of claim 1, wherein the composition has been prepared by dissolving all constituents in water, followed by evaporation to form a powder.

11. A method of producing a bonded mineral fiber product, wherein the method comprises contacting mineral fibers with the binder composition of claim 1 and curing the binder composition.

12. The method of claim 11, wherein curing of the binder composition in contact with the mineral fibers takes place in a heat press.

13. The method of claim 12, wherein curing of the binder composition in contact with the mineral fibers takes place at a temperature of from 160° C. to 260° C.

14. The method of claim 11, wherein no pre-polymerization of monomers in the binder composition takes place before application of the binder composition.

15. A mineral fiber product, wherein the product comprises mineral fibers in contact with the cured binder composition of claim 1 and has a density of from 80 to 1200 kg/m³ and/or a loss on ignition of from 3 to 30%.

* * * * *